United States Patent
Jin et al.

(10) Patent No.: US 9,973,271 B2
(45) Date of Patent: May 15, 2018

(54) METHOD AND DEVICE FOR CONFIGURING OTDR TEST PARAMETER SET

(71) Applicant: ZTE Corporation, Shenzhen (CN)

(72) Inventors: Xiaojing Jin, Shenzhen (CN); Dezhi Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 264 days.

(21) Appl. No.: 14/765,969

(22) PCT Filed: Aug. 30, 2013

(86) PCT No.: PCT/CN2013/082683
§ 371 (c)(1),
(2) Date: Aug. 5, 2015

(87) PCT Pub. No.: WO2014/121602
PCT Pub. Date: Aug. 14, 2014

(65) Prior Publication Data
US 2015/0381270 A1    Dec. 31, 2015

(30) Foreign Application Priority Data

Feb. 6, 2013  (CN) .......................... 2013 1 0047541

(51) Int. Cl.
*H04B 10/071*    (2013.01)
*H04B 10/077*    (2013.01)
(Continued)

(52) U.S. Cl.
CPC ....... *H04B 10/071* (2013.01); *G01M 11/3145* (2013.01); *H04B 10/0771* (2013.01);
(Continued)

(58) Field of Classification Search
CPC .................. H04B 10/071; G01M 11/3145
(Continued)

(56) References Cited

U.S. PATENT DOCUMENTS 6,989,893 B1    1/2006 Asher et al.
8,655,167 B1 *  2/2014 Lam ..................... H04B 10/071
                                                    398/16
(Continued)

FOREIGN PATENT DOCUMENTS

CN    101447832 A    6/2009
CN    101917226 A    12/2010
(Continued)

OTHER PUBLICATIONS

"according to." The American Heritage(R) Dictionary of the English Language, edited by Editors of the American Heritage Dictionaries, Houghton Mifflin, 6th edition, 2016. Credo Reference, http://search.credoreference.com/content/entry/hmdictenglang/according_to/0?institutionld=743. Accessed Nov. 1, 2017.*
(Continued)

*Primary Examiner* — David Payne
*Assistant Examiner* — Tanya Motsinger
(74) *Attorney, Agent, or Firm* — Cantor Colburn LLP

(57) ABSTRACT

Provided are a method and device for configuring an OTDR test parameter set. The above-mentioned method comprises: an FMS acquiring related information about an ODN according to a test result fed back by an OTDR; and the FMS configuring a test parameter set required for one or more subsequent OTDR tests according to the related information. According to the technical solution provided in the disclosure, the test parameter set required for initiating an OTDR test can be accurately acquired.

9 Claims, 2 Drawing Sheets

(51) Int. Cl.
*H04Q 11/00* (2006.01)
*G01M 11/00* (2006.01)

(52) U.S. Cl.
CPC ..... *H04B 10/0773* (2013.01); *H04Q 11/0067* (2013.01); *H04Q 2011/0083* (2013.01)

(58) Field of Classification Search
USPC .......................................................... 398/21
See application file for complete search history.

(56) References Cited

U.S. PATENT DOCUMENTS

| | | | | |
|---|---|---|---|---|
| 8,693,866 | B1* | 4/2014 | Lam ..................... | H04B 10/071 398/13 |
| 2004/0006726 | A1* | 1/2004 | Adam .................. | H04B 10/071 714/57 |
| 2005/0146711 | A1* | 7/2005 | Suino .................. | H04B 10/071 356/73.1 |
| 2011/0102776 | A1* | 5/2011 | Hasegawa .......... | G01M 11/3136 356/124.5 |
| 2011/0268438 | A1* | 11/2011 | Daems ............... | G01M 11/3136 398/16 |
| 2012/0163800 | A1* | 6/2012 | Urban ................ | G01M 11/3136 398/12 |
| 2012/0200846 | A1* | 8/2012 | Levin ................. | G01M 11/3145 356/73.1 |
| 2013/0088718 | A1* | 4/2013 | Perron ............... | G01M 11/3127 356/445 |
| 2014/0078506 | A1* | 3/2014 | Hu ..................... | G01M 11/3118 356/445 |
| 2014/0205279 | A1* | 7/2014 | Lee ..................... | H04B 10/071 398/21 |
| 2014/0212130 | A1* | 7/2014 | Urban ................ | G01M 11/3127 398/13 |
| 2014/0226970 | A1* | 8/2014 | Urban ................ | G01M 11/3127 398/21 |
| 2017/0111258 | A1* | 4/2017 | Bezold ................ | H04L 43/50 |

FOREIGN PATENT DOCUMENTS

| | | |
|---|---|---|
| CN | 101924590 A | 12/2010 |
| CN | 102739306 A | 10/2012 |
| JP | 2001308796 A | 11/2001 |
| WO | 2011147030 A1 | 12/2011 |

OTHER PUBLICATIONS

International Search Report dated Dec. 12, 2013 re: Application No. PCT/CN2013/082683; citing: CN 101447832 A, CN 102739306 A, CN 101917226 A and CN 101924590 A.

Supplementary European Search Report Application No. EP13874486; dated Feb. 8, 2016; pp. 8.

* cited by examiner

METHOD AND DEVICE FOR CONFIGURING OTDR TEST PARAMETER SET

TECHNICAL FIELD

The disclosure relates to the communications field, and in particularly to a method and device for configuring an optical time domain reflectometer (OTDR) test parameter set.

BACKGROUND

A passive optical network (PON) optical distribution network (ODN) is a point-to-multipoint network structure, and the network structure is far more complicated than a point-to-point optical network. Especially in a scenario of fibre to the home (FTTH) where fibres have come into thousands of households, the probability of fibre fault has greatly increased.

In order to overcome the problem of fibre fault in the optical network in FTTH, operators use an optical time domain reflectometer (OTDR) device at an OLT to detect the performance of the ODN regularly, thus locating the fibre fault.

The OTDR device is a specialized instrument and has many test parameters and performance indexes, and appropriate test parameters should be selected according to different optical paths and different test purposes when performing an OTDR test directed at different PON ODN networks. For example, for a fault on a branch and a fault on a trunk, different test parameters need to be used. However, for the PON ODN network with a large amount of fibres and great difference, it is very difficult to manually select measurement parameters.

SUMMARY

The embodiments of the disclosure provide a method and device for configuring an OTDR test parameter set, so as to at least solve the problem in the related art that it is difficult to manually select one or more measurement parameters.

The method for configuring an OTDR test parameter set is provided according to one aspect of the embodiments of the disclosure.

The method for configuring an OTDR test parameter according to an embodiment of the disclosure comprises: after an OTDR test, acquiring, by a fibre management system (FMS), related information about an optical distribution network (ODN) according to the test result fed back by the OTDR; and configuring, by the FMS, a test parameter set required for one or more subsequent OTDR tests according to the related information.

In an example embodiment, the related information comprises at least one of the followings: a trunk length, a branch length, a trunk segment loss, and an optical splitter insertion loss.

In an example embodiment, the required test parameter set comprises one of the followings: a trunk fault location test parameter set, a branch fault location test parameter set, a routine test parameter set.

In an example embodiment, each of the trunk fault location test parameter set, the branch fault location test parameter set, and the routine test parameter set comprises: a minimum pulse width, a test time, and a test range.

In an example embodiment, configuring, by the FMS, the trunk fault location test parameter set according to the relevant information comprises: according to a trunk segment loss, determining a dynamic range needing to be tested by the OTDR; determining and configuring the minimum pulse width where the OTDR satisfies the dynamic range; according to the trunk length, determining and configuring the test range and configuring the test range; and according to the trunk segment loss, determining and configuring the test time.

In an example embodiment, configuring, by the FMS, the branch fault location test parameter set according to the relevant information comprises:
according to the trunk segment loss, the branch length, a fibre attenuation coefficient and the optical splitter insertion loss, determining a theoretical faulted branch calculation loss; according to the theoretical faulted branch calculation loss, determining a dynamic range needing to be tested by the OTDR; determining and configuring the minimum pulse width where the OTDR satisfies the dynamic range; according to the trunk length and the branch length, determining and configuring the test range; and according to the theoretical faulted branch calculation loss, determining and configuring the test time.

In an example embodiment, configuring, by the FMS, the routine test parameter set according to the relevant information comprises: according to the trunk segment loss, the branch length, a fibre attenuation coefficient and the optical splitter insertion loss, determining a theoretical ODN calculation loss according to the trunk segment loss, the branch length, a fibre attenuation coefficient and the optical splitter insertion loss; according to the theoretical ODN calculation loss, determining a dynamic range needing to be tested by the OTDR test; determining and configuring the minimum pulse width where the OTDR satisfies the dynamic range; according to the trunk length and the branch length, determining and configuring the test range; and according to the theoretical ODN calculation loss, determining and configuring the test time.

In an example embodiment, after configuring, by the FMS, the test parameter set required for the one or more subsequent OTDR tests according to the related information, the method further comprises: adjusting, by the FMS, the required test parameter set according to one or more measurement parameters currently supported by the OTDR; and configuring, by the FMS, the adjusted test parameter set for the one or more OTDR tests.

In an example embodiment, after configuring, by the FMS, the adjusted required test parameter set for the one or more OTDR tests, the method further comprises: receiving, by the FMS, a test result from the OTDR; triggering the FMS to carry out acquiring the relevant information according to the test result and configuring the test parameter set required for one or more subsequent OTDR tests according to the relevant information again.

A device for configuring an OTDR test parameter set is provided according to another aspect of the embodiments of the disclosure.

The device for configuring an OTDR test parameter according to another embodiment of the disclosure comprises: an acquisition component configured to acquire related information about an ODN according to a test result fed back by the OTDR after an OTDR test; and a configuring component configured to configure a test parameter set required for one or more subsequent OTDR tests according to the related information.

In an example embodiment, the related information comprises at least one of the followings: a trunk length, a branch length, a trunk segment loss, and an optical splitter insertion loss.

In an example embodiment, the required test parameter set comprises one of the followings: a trunk fault location test parameter set, a branch fault location test parameter set, a routine test parameter set.

In an example embodiment, each of the trunk fault location test parameter set, the branch fault location test parameter set, and the routine test parameter set comprises: a minimum pulse width, a test time, and a test range.

In an example embodiment, the configuring component comprises: a first determination element configured to, according to a trunk segment loss, determine a dynamic range needing to be tested by the OTDR; a first configuring element configured to determine and configure the minimum pulse width where the OTDR satisfies the dynamic range; a second configuring element configured to, according to the trunk length, determine and configure the test range; and a third configuring element configured, according to the trunk loss, determine and configure the test time.

In an example embodiment, the configuring component comprises: a second determination element configured to, according to the trunk segment loss, the branch length, a fibre attenuation coefficient and the optical splitter insertion loss, determine a theoretical faulted branch calculation loss; a third determination element configured to, according to the theoretical faulted branch calculation loss, determine a dynamic range needing to be tested by the OTDR; a fourth configuring element configured to determine and configure the minimum pulse width where the OTDR satisfies the dynamic range; a fifth configuring element configured to, according to a trunk length and the branch length, determine and configure the test range; and a sixth configuring element configured to, according to the theoretical faulted branch calculation loss, determine and configure the test time.

In an example embodiment, the configuring component comprises: a fourth determination element configured to, according to the trunk segment loss, the branch length, a fibre attenuation coefficient and the optical splitter insertion loss, determine a theoretical ODN calculation loss; a fifth determination element configured to, according to the theoretical ODN calculation loss, determine a dynamic range needing to be tested by the OTDR; a seventh configuring element configured to determine and configure the minimum pulse width where the OTDR satisfies the dynamic range; an eighth configuring element configured, according to a trunk length and the branch length, determine and configure the test range; and a ninth configuring element configured to, according to the theoretical ODN calculation loss, determine and configure the test time.

In an example embodiment, the device further comprises: an adjustment component configured to adjust the required test parameter set according to the measurement parameter currently supported by the OTDR; and the configuring component further configured to the adjusted required test parameter set for the one or more OTDR tests.

By means of the embodiments of the disclosure, in which an FMS acquires related information about an ODN according to a test result fed back by an OTDR after an OTDR test, and the FMS configures a test parameter set required for one or more subsequent OTDR tests according to the related information, the problem in the related art of being difficult to manually select a measurement parameter is solved, thus being able to accurately acquire a test parameter test required for initiating one or more OTDR tests.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the drawings.

DETAILED DESCRIPTION OF EMBODIMENTS

The disclosure is described below in detail by reference to the accompanying drawings in conjunction with embodiments. Note that, the embodiments of the disclosure and the features of the embodiments can be combined with each other if there is no conflict.

Figure 1:
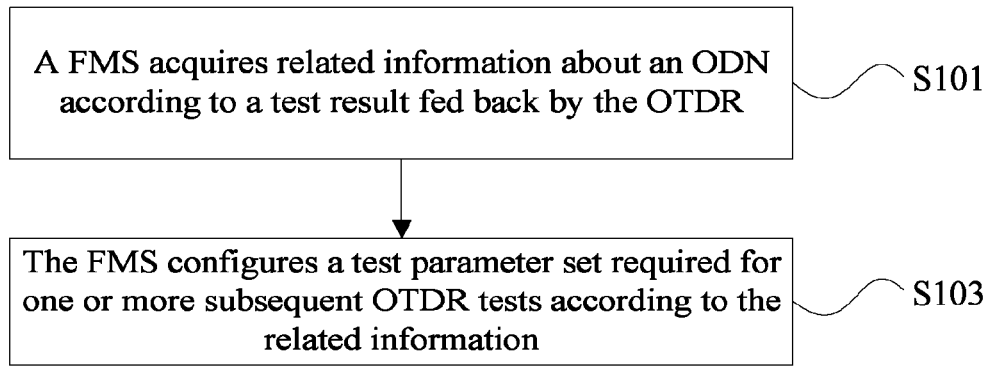
FIG. 1 is a flowchart of a method for configuring an OTDR test parameter according to an embodiment of the disclosure.

FIG. 1 is a flowchart of a method for configuring an OTDR test parameter according to an embodiment of the disclosure. As shown in FIG. 1, the method for configuring an OTDR test parameter set comprises the following processing steps:

step S101: a fibre management system (FMS) acquires related information about an optical distribution network (ODN) according to a test result fed back by the OTDR; and step S103: the FMS configures a test parameter set required for one or more subsequent OTDR tests according to the related information.

In the related art, for a PON network with a large amount of fibres and great difference, it is very difficult to manually select measurement parameters for initiating one or more OTDR tests. By means of the method shown in FIG. 1, in which the FMS acquires related information about the ODN according to the test result fed back by the OTDR, and the FMS configures the test parameter set required for one or more subsequent OTDR tests according to the related information, it is possible to accurately set a test parameter test required for initiating one or more OTDR tests.

The related information can include but not limited to at least one of the followings: a trunk length, a branch length, a trunk segment loss, and an optical splitter insertion loss.

The required test parameter set can include one of the followings: a trunk fault location test parameter set, a branch fault location test parameter set, a routine test parameter set.

In an example embodiment, before step S101, the method can further comprise the following processing:

(1) the FMS sends a test request to the OTDR; and (2) after the OTDR test, the FMS receives a test result from the OTDR.

The above-mentioned example implementation is described in conjunction with examples. Since user complaint or analysis device alarm triggers a BOSS to find that one or more fibres are likely to cause problems, the BOSS triggers the FMS to perform OTDR test on one of the one or more fibres. If the FMS has an interface with a PON element management system (EMS), then it is possible to acquire information of an optical line terminal (OLT) and an optical network element (ONU) device from the PON EMS, and preliminarily analyse whether the fault occurs at a trunk or a branch.

If it is analysed that the fault occurs at the trunk, then the required test parameter set is: a trunk fault location test parameter set; if it is analysed that the fault occurs at the branch, then the required test parameter set is: a branch fault location test parameter set; and if whether the fault occurs at the trunk or the branch cannot be analysed, then the required test parameter set is: a routine test parameter set. Therefore, the required test parameter set is one of the followings: the trunk fault location test parameter set, the branch fault location test parameter set, the routine test parameter set.

In an example implementation process, the test result in step S101 can include but not limited to: practically executed measurement parameters; an OTDR track curve; and an event table.

Wherein, the practically executed measurement parameters include but not limited to: a port number, a pulse width, a test wavelength, duration, range, and an optical fibre group refractive index (IOR).

Wherein, the OTDR track curve is a set of points including an abscissa and an ordinate corresponding to each point.

Wherein, the event includes a reflection event and a non-reflection event.

(1) The properties of the reflection event include but not limited to: a start position, an insertion loss, and a reflection peak height.

(2) The properties of the non-reflection event include but not limited to: the start position, and the insertion loss.

The FMS analyses the measurement result, and information about the ODN can be roughly analysed according to the test result, so as to obtain the trunk length, the position of an optical splitter, a splitting ratio, and the branching length.

For example, the features of the reflection event corresponding to the optical splitter are as follows:

feature (1): the insertion loss is greater than 3 dB; and feature (2): a reflection peak of reflection event is higher than a reflection peak of a flange.

The position of the optical splitter can be determined through features (1) and (2), and the trunk length can be acquired according to the position of the optical splitter. Reference can be made to the description in the related art for details, which will not be described herein.

In an example implementation process, the branch length can be acquired by one of the following ways:

way (1): the branch length can be determined by the reflection of a rear end ONU.

way (2): if there is a PON EMS, the FMS can also acquire the distance of each ONU from the PON EMS, thus calculating the branch length of each branch.

In an example implementation process, the optical splitter insertion loss can be acquired by one of the following ways:

way (1): for an optical splitter with a small splitting ratio, the OTDR can measure the optical splitter insertion loss accurately.

way (2): for an optical splitter with a large splitting ratio, due to too much insertion loss, the OTDR may not be able to measure an accurate insertion loss, and can merely measure that the insertion loss is greater than a predetermined value. In this case, way (3) below can be used for supplemental calculation.

way (3): if the FMS has an interface with the EMS, then the loss of the ODN can be estimated by measuring the difference between a luminescence power of a OLT and a received light power of a certain ONU. The formula below can be referenced for details:

the optical splitter insertion loss≈loss of the ODN−
loss of a fibre from the OLT to the ONU−constant It needs to be noted that:

(1) the constant is the loss of the other devices on the optical path, and is configured to a constant value according to a usual state of the ODN, e.g. 2 dB.

(2) loss of the fibre=fibre length×fibre attenuation coefficient (e.g. 0.3 dB/km)

In an example embodiment, each of the trunk fault location test parameter set, the branch fault location test parameter set, and the routine test parameter set can comprises: a minimum pulse width, a test time, and a test range.

In an example embodiment, the FMS configures the trunk fault location test parameter set according to the relevant information comprises the following processing steps:

(1) a dynamic range needing to be tested by the OTDR is determined according to the trunk segment loss;

(2) the minimum pulse width where the OTDR satisfies the dynamic range is determined and configured;

(3) the test range is determined and configured according to the trunk length; and (4) the test time is determined and configured according to the trunk loss.

In an example implementation process, the minimum pulse width, the test time, and the test range in the trunk fault location test parameter set can be determined by the following formulas:

The dynamic range required for the OTDR test is the trunk segment loss;

The minimum pulse width of the OTDR device satisfying the dynamic range is acquired: p;

the test range=the trunk length×1.$X$ . . . (wherein $X$ is an margin, and 1.$X$ is usually 1.1);

the test time (in a unit of second)=(the trunk segment loss×a constant) integer-converted value;

In an example embodiment, the FMS configures the branch fault location test parameter set according to the relevant information comprises the following processing steps:

(1) a theoretical faulted branch calculation loss is determined according to the trunk segment loss, the branch length, a fibre attenuation coefficient and the optical splitter insertion loss;

(2) a dynamic range needing to be tested by the OTDR is determined according to the theoretical faulted branch calculation loss;

(3) the minimum pulse width where the OTDR satisfies the dynamic range is determined and configured;

(4) the test range is determined and configured according to the trunk length and the branch length; and (5) the test time is determined and configured according to the theoretical faulted branch calculation loss.

In an example implementation process, the minimum pulse width, the test time, and the test range in the branch fault location test parameter set can be determined by the following formulas:

the theoretical faulted branch calculation loss=the trunk segment loss+the branch length×the fibre attenuation coefficient+the optical splitter insertion loss the dynamic range required for the OTDR test=the theoretical faulted branch calculation loss×a adjustment coefficient The minimum pulse width of the OTDR device satisfying the dynamic range is acquired: p the test range=(the trunk length+the branch length)×
1.$X$ (wherein $X$ is an margin, and 1.$X$ is usually 1.1)

the test time (in a unit of second)=(the theoretical faulted branch calculation loss×a constant) integer-converted value In an example embodiment, the FMS configures the routine test parameter set according to the relevant information includes the following processing steps:

(1) a theoretical ODN calculation loss is determined according to the trunk segment loss, the branch length, a fibre attenuation coefficient and the optical splitter insertion loss;

(2) a dynamic range needing to be tested by the an OTDR test is determined according to the theoretical ODN calculation loss;

(3) the minimum pulse width where the OTDR satisfies the dynamic range is determined and configured;

(4) the test range is determined and configured according to the trunk length and the branch length; and (5) the test time is determined and configured according to the theoretical ODN calculation loss.

In an example implementation process, the minimum pulse width, the test time, and the test range in the routine test parameter set can be determined by the following formula:

the theoretical ODN calculation loss=the trunk segment loss+the branch length×the fibre attenuation coefficient+the optical splitter insertion loss the dynamic range required for the OTDR test=the theoretical ODN calculation loss×a adjustment coefficient The minimum pulse width of the OTDR device satisfying the dynamic range is acquired: p the test range=the ODN maximum length×1.$X$
(wherein $X$ is an margin, and 1.$X$ is usually 1.1)

the test time (in a unit of second)=(the theoretical ODN calculation loss×a constant) integer-converted value In an example embodiment, after the FMS configures the test parameter set required for the one or more subsequent OTDR tests according to the related information, the method can further comprise the following processing steps:

(1) the FMS adjusts the required test parameter set according to the measurement parameter currently supported by the OTDR; and (2) the FMS configures the adjusted test parameter set for the one or more OTDR tests.

In an example implementation process, the FMS adjusts the calculated parameters in the measurement parameter set to the closest measurement parameters that the OTDR can support in fact, and then re-initiates one or more OTDR tests through the closest measurement parameters.

In an example embodiment, after the FMS configures the adjusted required test parameter set for the one or more OTDR tests, the method further comprises the following processing steps:

(1) the FMS receives a test result from the OTDR; and (2) the FMS is triggered to carry out the step of acquiring the relevant information according to the test result again and configured the test parameter set required for one or more subsequent OTDR tests according to the relevant information again.

That is, in an example implementation process, after receiving a new test result of the OTDR, the FMS re-analyses the new test result, and acquires new relevant information according to the new test result and sets a new test parameter set required for one or more subsequent OTDR tests according to the new relevant information. The FMS can also adjust the required test parameter set according to the measurement parameter currently supported by the OTDR, and configures the adjusted required test parameter set after that, so as to re-initiate one or more OTDR tests and an updated test result is fed back by the OTDR. It needs to be noted that the above-mentioned process can be loop carried out for a plurality of times, and after a plurality times of OTDR tests, the test precision of the OTDR can be effectively improved.

Figure 2:
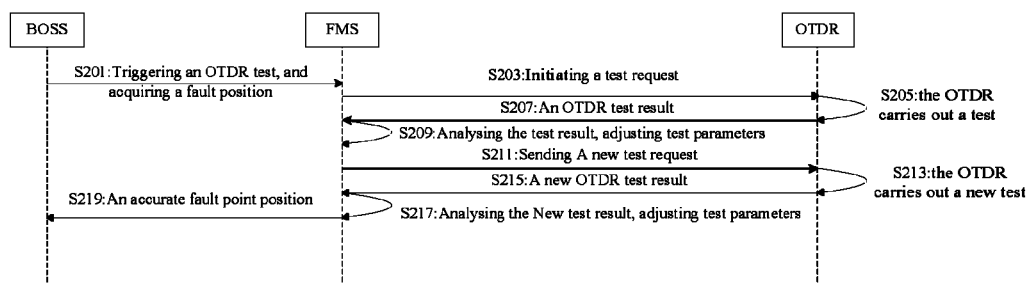
FIG. 2 is a schematic diagram of a method for configuring an OTDR test parameter according to a preferred embodiment of the disclosure.

The above-mentioned example implementation is further described in conjunction with FIG. 2.

FIG. 2 is a schematic diagram of a method for acquiring an OTDR test parameter according to a preferred embodiment of the disclosure. As shown in FIG. 2, the method mainly includes the following steps:

step S201: since user complaint or analysis device alarm triggers a business operation support system (BOSS) to find that a fault occurs in one or more fibres, the BOSS triggers the FMS to perform OTDR test on one of the one or more fibres.

For example, if the FMS has an interface with the passive optical network (PON) element management system (EMS), the FMS can acquire information about an optical line terminal (OLT) and an optical network unit (ONU) from the PON EMS, and preliminarily analyse whether the fault occurs at a trunk or a branch.

Step S203: the FMS initiates a test request to the OTDR, wherein test parameters include but not limited to: a port number, a pulse width, a test wavelength, test duration, range, and an optical fibre group refractive index (IOR).

Step S205: the OTDR carries out the test.

Step S207: the OTDR returns a test result.

For example, the test result includes but not limited to: practically executed measurement parameters; an OTDR track curve; and an event table.

The practically executed measurement parameters include but are not limited to: a port number, a pulse width, a test wavelength, duration, range, and an IOR.

Wherein, the OTDR track curve is a set of points including an abscissa and an ordinate corresponding to each point.

Wherein, the event includes a reflection event and a non-reflection event.

(1) The properties of the reflection event include but are not limited to: a start position, an insertion loss, and a reflection peak height.

(2) The properties of the non-reflection event include but not limited to: the start position, and the insertion loss.

Step S209: The FMS analyses the measurement result, and relevant information about the ODN can be roughly analysed according to the test result, so as to obtain the trunk length, the position of an optical splitter, a splitting ratio, and the branching length.

After that, the FMS can automatically calculate the best test parameter set according to a test purpose, information of the ODN, and a parameter selection formula, wherein parameters in the test parameter set mainly includes: a minimum pulse width, a test time, and a test range.

It the MFS analyses that the fault occurs at a trunk of the fibre, then the calculation way of a trunk fault location test parameter test is as follows:

a) a dynamic range required for an OTDR test=a trunk segment loss b) a minimum pulse width of a OTDR device satisfying the dynamic range is acquired: p c) a test range=a trunk length×1.X . . . (wherein X is a margin)

d) test time (in a unit of second)=(the trunk segment loss×a constant) integer-converted value It the MFS analyses that the fault occurs at a branch of the fibre, then the calculation way of a branch fault location test parameter test is as follows:

a) a theoretical faulted branch calculation loss=the trunk segment loss+the branch length×a fibre attenuation coefficient+a optical splitter insertion loss b) dynamic range required for an OTDR=the theoretical faulted branch calculation loss×a adjustment coefficient (e.g. 1)

It needs to be noted that the above-mentioned adjustment coefficient can be smaller than one. This is because, considering that the reflection of an optical splitter is strong, which will result in a large event dead zone, in order to reduce the dead zone, a smaller dynamic range can be selected specially, and the adjustment coefficient is adjusted according to the characters of different OTDR devices.

c) The minimum pulse width of the OTDR device satisfying the dynamic range is acquired: p d) the test range=(the trunk length+the branch length)× 1.X (wherein X is a margin)

e) the test time=(the theoretical faulted branch calculation loss×a constant) integer-converted value (second)

If whether a fibre fault occurs at a trunk or a branch is unclear, routine test parameters can be used as OTDR test parameters. The calculation way of the routine test parameter set is as follows:

a) the theoretical ODN calculation loss=the trunk segment loss+the branch length×the fibre attenuation coefficient+the optical splitter insertion loss b) the dynamic range required for an OTDR=the theoretical ODN calculation loss×a adjustment coefficient (usually 2)

c) the minimum pulse width of the OTDR device satisfying the dynamic range is acquired: p d) the test range=the ODN maximum length×1.X (wherein X is a margin)

e) the test time (in a unit of second)=(the theoretical ODN calculation loss×a constant) integer-converted value When acquiring capability (a test parameter range, one or more performance parameters) of an OTDR device, parameters in the test parameter set calculated in the previous step are matched to the closest test parameters that the OTDR device can reach.

Step S211: the FMS initiates a new test request to the OTDR.

Step S213: the OTDR uses parameters in the test parameter set as OTDR test parameters, and the OTDR performs a new test again.

Step S215: the OTDR returns a new test result.

In an example implementation process, after step S215 is carried out, step S209 can be jumped to, and then step S209 to step S215 are carried out in sequence in a loop, until the best test parameter set most suitable for the OTDR test of the ODN is acquired, facilitating accurately testing line performance and fault location.

Step S217: the FMS analyses the new test result and acquires the position of a fault point.

In an example implementation process, if there is a healthy base of the same test parameters, the FMS can compared the current test result with healthy base data, thus being able to obtain a more precise fault position.

Step S219: the FMS feeds back the obtained result to the BOSS.

Figure 3:
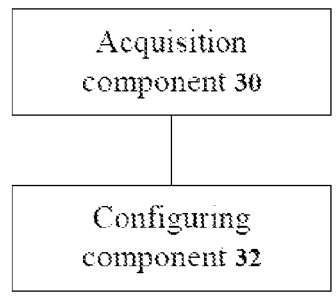
FIG. 3 is a structural block diagram of a device for configuring an OTDR test parameter according to an embodiment of the disclosure.

FIG. 3 is a structural block diagram of a device for configuring an OTDR test parameter according to an embodiment of the disclosure. As shown in FIG. 3, the device for configuring an OTDR test parameter set includes: an acquisition component 30 which is configured to acquire related information about an optical distribution network (ODN) according to a test result fed back by the OTDR after an OTDR test; and a configuring component 32, which is connected to the acquisition component 30 and configured to configure a test parameter set required for one or more subsequent OTDR tests according to the related information.

In the device shown in FIG. 3, the acquisition component 30 acquires related information about the ODN according to the test result fed back by the OTDR after the OTDR test is executed; and the configuring component 32 configures the test parameter set required for one or more subsequent OTDR tests according to the related information, thus being able to accurately set a test parameter test required for initiating one or more OTDR tests.

Figure 4:
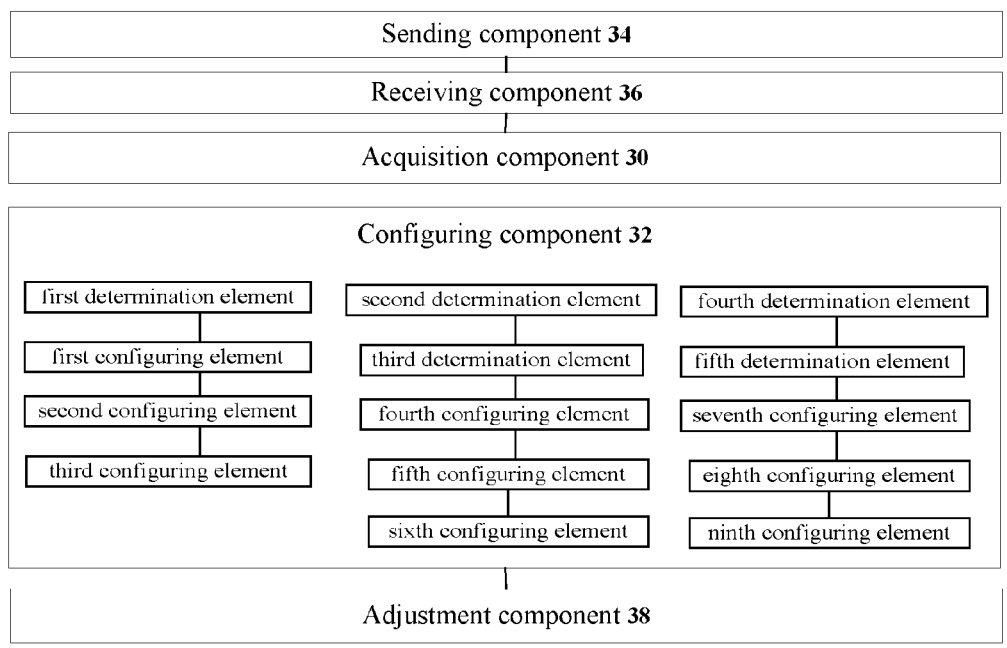
FIG. 4 is a structural block diagram of a device for configuring an OTDR test parameter according to a preferred embodiment of the disclosure.

In an example embodiment, as shown in FIG. 4, the device can further comprise: a sending component 34 which is configured to send a test request to the OTDR; and a receiving component 36, which is connected to the sending component 34 and the acquisition component 30 and configured to receive the test result returned by the OTDR after the OTDR test is executed.

The related information includes but not limited to at least one of the followings: a trunk length, a branch length, a trunk segment loss, and an optical splitter insertion loss.

The required test parameter set includes one of the followings: a trunk fault location test parameter set, a branch fault location test parameter set, a routine test parameter set.

Each of the trunk fault location test parameter set, the branch fault location test parameter set, and the routine test parameter set includes: a minimum pulse width, a test time, and a test range.

In an example embodiment, the configuring component 32 can further include: a first determination element which is configured to, according to a trunk segment loss, determine a dynamic range needing to be tested by the OTDR; a first configuring element which is configured to determine and configure the minimum pulse width where the OTDR satisfies the dynamic range; a second configuring element which is configured to, according to the trunk length, determine and configure the test range; and a third configuring element which is configured to, according to the trunk loss, determine and configure the test time.

In an example embodiment, the configuring component 32 can further include: a second determination element which is configured to, according to the trunk segment loss, the branch length, a fibre attenuation coefficient and the optical splitter insertion loss, determine a theoretical faulted branch calculation loss; a third determination element which is configured to, according to the theoretical faulted branch calculation loss, determine a dynamic range needing to be tested by the OTDR; a fourth configuring element which is configured to determine and configure the minimum pulse width where the OTDR satisfies the dynamic range and configure the minimum pulse width; a fifth configuring element configured to, according to a trunk length and the branch length, determine and configure the test range; and a sixth configuring element which is configured to, according to the theoretical faulted branch calculation loss, determine and configure the test time.

In an example embodiment, the configuring component 32 can also further include: a fourth determination element which is configured to according to the trunk segment loss, the branch length, a fibre attenuation coefficient and the optical splitter insertion loss, determine a theoretical ODN calculation loss; a fifth determination element which is configured to, according to the theoretical ODN calculation loss, determine a dynamic range needing to be tested by the OTDR; a seventh configuring element which is configured to determine and configure the minimum pulse width where the OTDR satisfies the dynamic range; an eighth configuring element configured to, according to a trunk length and the branch length, determine and configure the test range; and a ninth configuring element which is configured to, according to the theoretical ODN calculation loss, determine and configure the test time.

In an example embodiment, as shown in FIG. 4, the device can further include: an adjustment component 38, which is connected to the configuring component 32 and configured to adjust the required test parameter set according to the measurement parameter currently supported by the OTDR; and the configuring component 32 which is further configured to configure the adjusted test parameter set for the one or more OTDR tests.

In an example implementation process, after the configuring component 32 configures the adjusted test parameter set to perform a new OTDR test, the receiving component 36 receives a new test result fed back by the OTDR, the acquisition component 30 re-analyses the new test result, and acquires the new relevant information according to the new test result, and the configuring component 32 configures a new test parameter set required for one or more subsequent OTDR tests according to the new relevant information. The adjustment component 38 can also adjust the required test parameter set according to the measurement parameter currently supported by the OTDR; after that, the configuring component 32 sets the adjusted test parameter set to perform a new OTDR test and return an updated test result. It needs to be noted that the process can be loop carried out for a plurality of times, and after a plurality times of OTDR test, the test precision of the OTDR can be effectively improved.

In an example embodiment, the device for acquiring an OTDR test parameter set can be provided in the FMS.

It needs to be noted that the example implementation process in which various components and various elements in the device for acquiring an OTDR test parameter set can particularly refer to the description of FIG. 1 and FIG. 2, which will not be described any more.

To sum up, by means of the embodiments provided in the disclosure, the FMS acquires related information about the ODN according to the test result of an OTDR after the OTDR test is executed, and the FMS obtains the test parameter set required for re-initiating one or more OTDR tests by calculating according to the related information, it is possible to accurately configure a test parameter test required for initiating one or more OTDR tests. After a plurality of times of OTDR tests, the test precision of an OTDR can be effectively improved, so as to acquire an optimal OTDR rest parameter set.

Obviously, those skilled in the art should know that each of the mentioned modules or steps of the disclosure may be realized by universal computing devices; the modules or steps may be focused on single computing device, or distributed on the network formed by multiple computing devices; selectively, they may be realized by the program codes which may be executed by the computing device; thereby, the modules or steps may be stored in the storage device and executed by the computing device; and under some circumstances, the shown or described steps may be executed in different orders, or may be independently manufactured as each integrated circuit module, or multiple modules or steps thereof may be manufactured to be single integrated circuit module, thus to be realized. In this way, the disclosure is not restricted to any particular hardware and software combination.

The descriptions above are only the preferable embodiment of the disclosure, which are not used to restrict the disclosure, for those skilled in the art, the disclosure may have various changes and variations. Any amendments, equivalent substitutions, improvements, etc. within the principle of the disclosure are all included in the scope of the protection of the disclosure.

INDUSTRIAL APPLICABILITY

The technical solutions of the embodiments of the disclosure can be applied to the fibre networks field, solving the problem in the related art of being difficult to manually select a measurement parameter, thus being able to accurately acquire a test parameter test required for initiating an OTDR test, and saving costs for network maintenance of the operator.

What is claimed is:

1. A method for configuring an optical time-domain reflectometer, OTDR, test parameter set, comprising:
    acquiring, by a fibre management system, FMS, related information about an optical distribution network, ODN, according to a test result fed back by an OTDR; and
    configuring, by the FMS, a test parameter set required for one or more subsequent OTDR tests according to the related information;
    wherein the relevant information comprises at least one of the followings: a trunk length, a branch length, a trunk segment loss, and an optical splitter insertion loss; the required test parameter set comprises one of the followings: a trunk fault location test parameter set, a branch fault location test parameter set, a routine test parameter set; and each of the trunk fault location test parameter set, the branch fault location test parameter set, and the routine test parameter set comprises: a minimum pulse width, a test time, and a test range;
    wherein configuring, by the FMS, the trunk fault location test parameter set according to the relevant information comprises: according to the trunk segment loss, determining a dynamic range needing to be tested by the OTDR; determining and configuring the minimum pulse width where the OTDR satisfies the dynamic range; according to the trunk length, determining and configuring the test range; and according to the trunk segment loss, determining and configuring the test time.

2. The method according to claim 1, wherein configuring, by the FMS, the branch fault location test parameter set according to the relevant information comprises:

according to the trunk segment loss, the branch length, a fibre attenuation coefficient and the optical splitter insertion loss, determining a theoretical faulted branch calculation loss;

according to the theoretical faulted branch calculation loss, determining a dynamic range needing to be tested by the OTDR;

determining and configuring the minimum pulse width where the OTDR satisfies the dynamic range;

according to the trunk length and the branch length, determining and configuring the test range; and according to the theoretical faulted branch calculation loss, determining and configuring the test time.

3. The method according to claim 1, wherein configuring, by the FMS, the routine test parameter set according to the relevant information comprises:

according to the trunk segment loss, the branch length, a fibre attenuation coefficient and the optical splitter insertion loss, determining a theoretical ODN calculation loss;

according to the theoretical ODN calculation loss, determining a dynamic range needing to be tested by the OTDR;

determining and configuring the minimum pulse width where the OTDR satisfies the dynamic range;

according to the trunk length and the branch length, determining and configuring the test range; and according to the theoretical ODN calculation loss, determining and configuring the test time.

4. The method according to claim 1, wherein after configuring, by the FMS, the test parameter set required for the one or more subsequent OTDR tests according to the related information, the method further comprises:

adjusting, by the FMS, the required test parameter set according to one or more measurement parameters currently supported by the OTDR; and configuring, by the FMS, the adjusted test parameter set for the one or more OTDR tests.

5. The method according to claim 4, wherein after configuring, by the FMS, the adjusted test parameter set for the one or more OTDR tests, the method further comprises:

receiving, by the FMS, a test result from the OTDR; and triggering the FMS to carry out acquiring the relevant information according to the test result and configuring the test parameter set required for one or more subsequent OTDR tests according to the relevant information again.

6. A device for configuring an optical time-domain reflectometer, OTDR, test parameter set, comprising:

an acquisition component configured to acquire related information about an optical distribution network, ODN, according to a test result of an OTDR; and a configuring component configured to configure a test parameter set required for one or more subsequent OTDR tests according to the related information;

wherein the relevant information comprises at least one of the followings: a trunk length, a branch length, a trunk segment loss, and an optical splitter insertion loss; the required test parameter set comprises one of the followings: a trunk fault location test parameter set, a branch fault location test parameter set, a routine test parameter set; and each of the trunk fault location test parameter set, the branch fault location test parameter set, and the routine test parameter set comprises: a minimum pulse width, a test time, and a test range;

wherein the configuring component comprises: a first determination element configured to, according to the trunk segment loss, determine a dynamic range needing to be tested by the OTDR; a first configuring element configured to determine and configure the minimum pulse width where the OTDR satisfies the dynamic range; a second configuring element configured to, according to the trunk length, determine and configure the test range; and a third configuring element configured to, according to the trunk loss, determine and configure the test time.

7. The device according to claim 6, wherein the configuring component comprises:

a second determination element configured to, according to the trunk segment loss, the branch length, a fibre attenuation coefficient and the optical splitter insertion loss, determine a theoretical faulted branch calculation loss;

a third determination element configured to, according to the theoretical faulted branch calculation loss, determine a dynamic range needing to be tested by the OTDR;

a fourth configuring element configured to determine and configure the minimum pulse width where the OTDR satisfies the dynamic range;

a fifth configuring element configured to, according to a trunk length and the branch length, determine and configure the test range; and a sixth configuring element configured to, according to the theoretical faulted branch calculation loss, determine and configure the test time.

8. The device according to claim 6, wherein the configuring component comprises:

a fourth determination element configured to, according to the trunk segment loss, the branch length, a fibre attenuation coefficient and the optical splitter insertion loss, determine a theoretical ODN calculation loss;

a fifth determination element configured to, according to the theoretical ODN calculation loss, determine a dynamic range needing to be tested by the OTDR;

a seventh configuring element configured to determine and configure the minimum pulse width where the OTDR satisfies the dynamic range;

an eighth configuring element configured to, according to a trunk length and the branch length, determine and configure the test range; and a ninth configuring element configured to, according to the theoretical ODN calculation loss, determine and configure the test time.

9. The device according to claim 6, wherein the device further comprises: an adjustment component configured to adjust the required test parameter set according to the measurement parameter currently supported by the OTDR; and the configuring component further configured to configure the adjusted test parameter set for the one or more OTDR tests.

* * * * *